(12) United States Patent
Patel et al.

(10) Patent No.: US 7,154,668 B2
(45) Date of Patent: Dec. 26, 2006

(54) WAVELENGTH DEPENDENT OPTICAL ATTENUATOR AND VARIABLE ATTENUATION PROFILE CONTROLLER

(75) Inventors: Jayantilal S. Patel, Newtown, PA (US); Zhizhong Zhuang, Bensalem, PA (US)

(73) Assignee: Optellios, Inc., Ewing, NJ (US)

( * ) Notice: Subject to any disclaimer, the term of this patent is extended or adjusted under 35 U.S.C. 154(b) by 1011 days.

(21) Appl. No.: 10/199,180

(22) Filed: Jul. 19, 2002

(65) Prior Publication Data

US 2003/0053173 A1 Mar. 20, 2003

Related U.S. Application Data

(63) Continuation-in-part of application No. 10/013,262, filed on Dec. 10, 2001, and a continuation-in-part of application No. 09/974,826, filed on Oct. 12, 2001, now Pat. No. 6,535,335.

(60) Provisional application No. 60/315,318, filed on Aug. 28, 2001, provisional application No. 60/304,340, filed on Jul. 10, 2001.

(51) Int. Cl.
*G02B 27/28* (2006.01)
*G02B 5/30* (2006.01)

(52) U.S. Cl. ............. 359/494; 359/501; 359/497; 359/256

(58) Field of Classification Search ............ 359/256, 359/494, 497, 498, 499, 501
See application file for complete search history.

(56) References Cited

U.S. PATENT DOCUMENTS 4,575,849 A * 3/1986 Chun ................... 372/9

| | | | |
|---|---|---|---|
| 5,414,541 A | 5/1995 | Patel et al. | |
| 5,694,233 A | 12/1997 | Wu et al. | |
| 5,946,116 A | 8/1999 | Wu et al. | |

(Continued)

OTHER PUBLICATIONS

S.E. Harris, et al., "Optical Network Synthesis Using Birefringent Crystals. I. Synthesis of Lossless Networks of Equal-Length Crystals", Journal of the Optical Society of America, vol. 54, No. 10, pp. 1267-1279, Oct. 1964.

(Continued)

*Primary Examiner*—Ricky Mack
*Assistant Examiner*—Brandi Thomas
(74) *Attorney, Agent, or Firm*—Duane Morris LLP (57) ABSTRACT

The attenuation profile of an optical system, which defines the power variation as a function of wavelength is adjusted to alter the slope of its contour. The device is useful in a wavelength division modulation system to flatten the profile of an amplifier or the like that has a non uniform power variation with wavelength. The invention adjusts the slope by first providing an input light signal that has a known polarization state, e.g., processing the input into a known phase and amplitude relation between orthogonal components, such as plane polarized at a given alignment. The signal is then passed through a series of waveplates. The waveplates have different phase retardation and orientation resulting in wavelength dependent polarization change. According to an inventive aspect, by tuning the phase retardation of multiple tunable waveplates the desired wavelength dependent polarization changes over a useful wavelength range can be produced. At the downstream end of the signal path, a polarization discriminating element such as a polarizer or beam splitter, passes or blocks light energy as a function of polarization, thus converting the variation of polarization state into a variation of amplitude.

36 Claims, 6 Drawing Sheets

U.S. PATENT DOCUMENTS

| | | |
|---|---|---|
| 5,978,116 A | 11/1999 | Wu et al. |
| 5,978,125 A | 11/1999 | Yao |
| 6,163,393 A | 12/2000 | Wu et al. |
| 6,212,313 B1 | 4/2001 | Li |
| 6,215,923 B1 | 4/2001 | Li |
| 6,219,176 B1 | 4/2001 | Terahara |
| 6,243,200 B1 | 6/2001 | Zhou et al. |
| 6,333,816 B1 | 12/2001 | Chen et al. |
| 6,816,261 B1 * | 11/2004 | Patel et al. ................. 356/365 |

OTHER PUBLICATIONS

E.O. Ammann, et al., "Optical Network Synthesis using Birefringent Crystals. II. Synthesis of Networks Containing One Crystal, Optical Compensator, and Polarizer per Stage," Journal of the Optical Society of America, vol. 55, No. 7, pp. 835-841, Jul. 1965.

* cited by examiner

WAVELENGTH DEPENDENT OPTICAL ATTENUATOR AND VARIABLE ATTENUATION PROFILE CONTROLLER

CROSS REFERENCE TO RELATED APPLICATIONS

This application claims the priority of U.S. Provisional Applications Ser. No. 60/304,340, filed Jul. 10, 2001, and Ser. No. 60/315,318, filed Aug. 28, 2001, and is a continuation in part of application Ser. No. 09/974,826, filed Oct. 12, 2001 now U.S. Pat. No. 6,535,335 and of Ser. No. 10/013,262, filed Dec. 10, 2001.

BACKGROUND OF THE INVENTION

The invention relates to techniques and devices for adjusting the transfer function of an optical device or system by varying the profile of attenuation as a function of wavelength. The invention is particularly useful, for example, in wavelength division multiplexing (WDM), especially in dense WDM (DWDM) communication systems.

According to an inventive aspect, one or more polarization encoding steps impart polarization attributes to a signal as a function of wavelength. The polarization attributes provide characteristics by which it is possible to selectively impart controlled amount of attenuation as a function of wavelength. The encoded signal is applied to polarization sensitive elements that provide differing attenuation as a function of polarization. The result is a practical and effective attenuation profile control, i.e., control of attenuation, as a function of wavelength.

According to a further inventive aspect, a series of tunable birefringent waveplates are stacked with at least one fixed waveplate and polarizing filters, to provide a transfer function that is approximately linear as a function of wavelength. The slope, the range of wavelength of interest, the overall attenuation and the peak position of which are adjustable by tuning the retardation of the tunable birefringent waveplates.

PRIOR ART

Wavelength division multiplexing generally exploits the transmission capacity of an optical fiber or other optical path, by transmitting several optical signals at different wavelengths concurrently. To render these systems practical, the associated optical amplifiers and other transmission arrangements advantageously should provide substantially uniform power levels at all signal wavelengths that are employed in the transmission channels.

Various factors can affect the gain or loss profile of a transmission system, amplifier or other device over a wavelength range of interest. The gain or the attenuation profile of a transmission device or system can be highly non-uniform. Methods are needed for adjusting these profiles of the optical amplifier or other device or system, normally to flatten the power level transmission function over a given wavelength range. The slope of the power level as a function of wavelength can be termed the tilt profile. It is an object of the invention to provide an optimal variable tilt profile control.

A common optical amplifier is the erbium doped fiber amplifier (EDFA). The gain spectrum or profile of the EDFA intrinsically is highly non-uniform. Furthermore, the gain spectrum is determined by the average inversion level, which is a function of the signal power level and the power level of the pump sources. These parameters are potentially variable, which complicates the problem of providing uniform gain.

It may be possible to flatten the gain spectrum or profile of a transmission path two steps, which is described in U.S. Pat. No. 6,219,176—Terahara. First, a fixed gain equalizer, such as an attenuation profile controller having a fixed wavelength characteristic of gain or loss, is used to obtain a gain that changes substantially linearly with wavelength. A variable attenuation profile controller then is used on the linearly varying gain signal, to flatten the gain spectrum.

Variable attenuation profile control is apt for use with optical amplifiers and devices other than the EDFA. Examples include thulium-doped fiber amplifiers (TDFA) (I. G. Clarke, M. Meleshkevich, M. Martin, and J. Poirier, TuQ2-1, OFC 2001) and Raman amplifiers (P. M. Krummrich, R. E. Neuhauser, and C. Glingener, MI3-1, OFC 2001). Raman coupling, and pump interaction, create a gain or loss which is substantially linear with respect to wavelength. Generally, the gain curve of a Raman amplifier rises linearly with the difference between the pump wavelength and the signal wavelength. It continues to increase linearly for about 100 nm above the pump wavelength and then falls rapidly. Therefore, it would be advantageous to provide an optimal variable attenuation profile control device to make full use of such amplifiers.

In one possible arrangement for a gain flattening filter, and/or an attenuation profile control, optical arrangements are provided first to separate out individual wavelength channels, i.e., to demultiplex the multi-channel WDM transmission. Each of the channels is attenuated by the amount needed to produce the desired transfer function or gain profile as a function of wavelength. That profile could be flat or could have a modest and preferably linear slope. This process uses discrete attenuators for each channel, each potentially set to a different level of attenuation. Afterwards, the attenuated channel signals are multiplexed back into a single communications path, such as an optical fiber.

Typical insertion loss of demux-and-mux devices as described are generally high. All but the lowest amplitude parts of the spectrum need to be attenuated somewhat so that the resulting gain profile is flattened, thereby introducing an inherent loss, for example an additional 1–2 dB. Another drawback is that devices based on demux geometry generally require space and elements for diffractive beam splitting, and are bulky and expensive. It would be advantageous to provide a new approach in which no demux operation is needed.

Dynamic gain-flattening filters (GFF) can function as variable attenuation profile controls. An object is to adjust the slope of a transfer function over a range of wavelengths, while the adjustment of the slope can be static or dynamic. Normally the intent is specifically to flatten the transfer function profile, by inserting a filter that counteracts the wavelength dependent loss or gain profile introduced by one or more other components. A GFF, however, may be complicated in structure and function. For example, a GFF generally needs a complicated control and/or feedback algorithm. It would also be advantageous if an attenuation profile control could be realized using a simple structure with a simple control algorithm.

Figure 2:
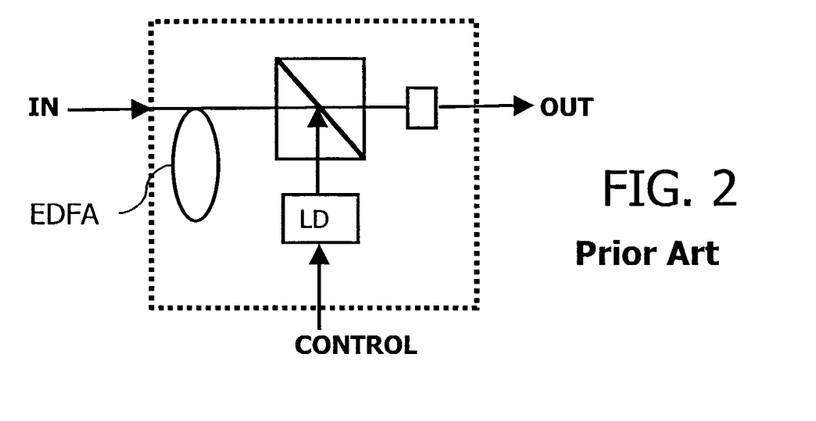
FIGS. 2 and 3, labeled "Prior Art" are representations of the structure and effect of a known gain equalization device for an erbium doped fiber amplifier configuration (EFDA), using a series of wavelengths in the 1550 nm range.

Some examples of variable tilt profile controls are known in the art, a few being represented in the appended drawings and labeled "Prior Art." In the arrangement described in U.S. Pat. No. 6,219,176—Terahara, a characteristic profile of gain as a function of wavelength is generated by an EDFA. The profile can be changed by adjusting the drive current applied to a laser diode LD according to a control signal supplied to a control terminal. (See FIG. 2).

Figure 3:
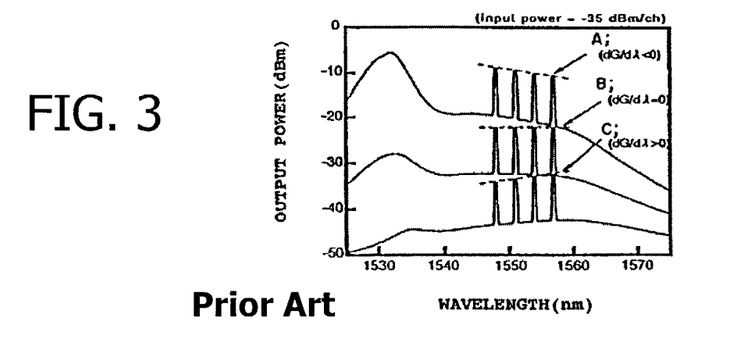
Figure 4A:
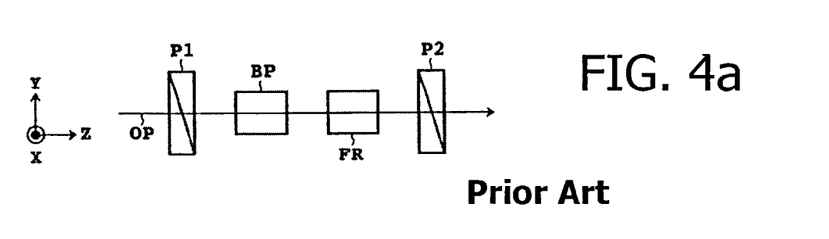
FIGS. 4a and 4b, labeled "Prior Art" are schematic diagrams of an optical system configuration using Faraday Rotators.
Figure 4B:
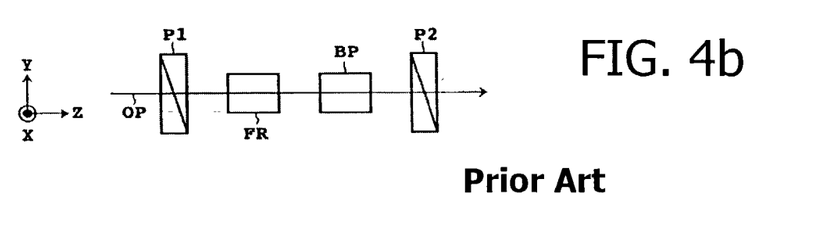

By using an EDFA that is co-doped with a high concentration of Al, a characteristic profile of gain as a function of wavelength can be made more or less linear in a particular band. FIG. 3 is a plot of output power as a function of wavelength in a range of about 1540 nm to about 1560 nm. The slope, defined by the gain on a line through the defined channel peaks, can be adjusted by controlling the pump light power in the apparatus shown in FIG. 2. The slope is changeable as shown by example traces A, B and C in FIG. 3. FIGS. 4a and 4b show two different functional layouts that can be seen to provide a variation in amplitude of a transfer function over a span of wavelength.

A birefringent waveplate BP, by definition, has a different index of refraction for light components aligned at two orthogonal axes. The phase through the birefringent waveplate is different for polarized components aligned to the two axes. This phase difference introduces a change in polarization state. The phase difference depends on the wavelength of the light wave at issue. Thus, the polarization state varies with the wavelength of the light signal.

Figure 5:
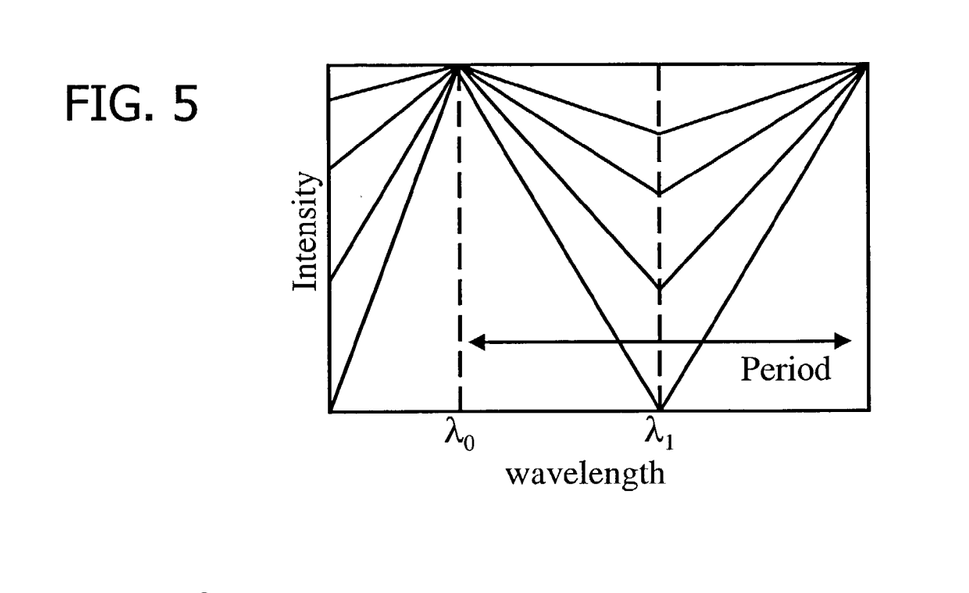
FIG. 5 is a plot of intensity versus wavelength, which is variable according to the present invention.

FIG. 5 is a plot showing intensity or transmissiveness as a function of wavelength, in the area of a maximum and minimum at two wavelengths $\lambda_0$ and $\lambda_1$. A Faraday Rotator FR arrangement as in FIGS. 4a, 4b to impart a polarization rotation has the drawback that one cannot change certain parameters of the plot shown in FIG. 5 using such a configuration. Adjusting the Faraday Rotator increases and decreases the span of difference between the maximum and minimum intensity. It would be advantageous if the cusp wavelengths $\lambda_0$ and $\lambda_1$ also could be moved, e.g., chosen to fall where desired, and/or to bring the cusps nearer and farther apart as a way to adjust the slope, and also to permit a choice of the amplitude span between the maximum and minimums at the cusps. Furthermore, the configuration shown in FIGS. 4a and 4b requires the fixed attenuation at wavelengths $\lambda_0$ and $\lambda_1$ to be 3 dB loss of signal power, which usually are not desired.

The present invention not only provides these advantages, but also provides a mechanism to sweep through a range of wavelengths. Furthermore, these advantages are achieved while limiting or eliminating loss of signal power.

SUMMARY OF THE INVENTION

An object of the invention is to provide a practical attenuation profile control device, which is based on the polarization encoding of the wavelength.

The polarization encoding produces a wavelength-dependent polarization variation. Wavelength-dependent losses may then be imparted by use of polarization sensitive components, such as polarized filters (polarizers) and polarization-sensitive beam diversion devices.

The device of the invention is preferably tunable using controllable optical elements. In particular, one or more electrically controllable tunable optical elements, such as liquid crystal elements but possibly also comprising other electro-optical crystals, are advantageously used.

According to an inventive aspect, the intensity profile of the transfer function of an optical system is adjusted to alter the slope of its contour, e.g., to adjust gain and/or attenuation as a function of wavelength. The device is useful in a wavelength division multiplexing system to flatten the profile of uneven optical power of different wavelength signals. The invention adjusts the slope of the power variation with wavelength by first providing an input light signal that has known polarization states. The signal is then passed through a series of waveplates. The waveplates have different retardation and orientation, resulting in a change of polarization state as a function of wavelength. At the downstream end of the signal path, a polarization discriminating element such as a polarizer or beam splitter, passes or blocks light energy as a function of polarization, thus converting the variation of polarization state into a variation of intensity.

According to another inventive aspect, the profile of the transfer function is adjusted as to the breakpoint wavelengths where maximum and minimum amplitudes occur, the difference between maximum and minimum values and/or the slope of the profile or separation between breakpoints, using tunable birefringent elements such as liquid crystals. Using a series of waveplates that are aligned at different angles (e.g. 45° relative to one another), at least some of which can be tunably controllable, the profile of intensity versus wavelength is adjusted to provide a substantially linear slope over a useful wavelength range of interest. Variations are disclosed in which pairs of tunable waveplates straddle a fixed waveplate along the transmission path, and are aligned preferably at 45° to the tunable ones.

More particularly, the apparatus comprises at least one polarization-referenced input signals with predetermined polarization states, which may be generated by at least one polarization-referenced input element (P1), that is disposed in the light transmission path. In the basic embodiment, a plane-polarized input is provided. In the alternative, a polarization diversity arrangement can be used to separate unknown polarization into two known orthogonal components.

A differential phase retardation section (B0, B1, B2) coupled to the polarization-referenced input signal and produce a continuous change in polarization state as a function of wavelength, in an output from the differential phase retardation section, over said wavelength band.

The present invention further comprising at least one polarization-referenced output element (P2) operable to discriminate components of the output of the differential phase retardation section as a function of polarization state, thereby altering said contoured profile of attenuation, as a function of wavelength.

The invention provides a novel design for a Variable Optical Attenuation profile control, which has a simple structure. Inventive structures and control algorithms are provided for controlling the tunable elements. The device can be arranged so as not to introduce any unnecessary loss to the system, although the overall attenuation can also be adjusted if so required. In the following, as example, a configuration based on stack of birefringent waveplates is discussed in details. It is apparent for those skilled in the art, based on the same underline principle, other configurations are possible.

BRIEF DESCRIPTION OF THE DRAWINGS

The drawings illustrate a number of arrangements and embodiments that are presently preferred. It should be understood that the invention is not limited to the arrangements shown, wherein.

DETAILED DESCRIPTION OF THE PREFERRED EMBODIMENTS

According to an inventive aspect, a substantial improvement on attenuation profile adjusting and flattening arrangements are provided. An input signal is applied to the invention of arbitrary polarization, which is converted to a predetermined polarization state and a range of wavelengths, being established, for example by a polarizer P1, shown in FIG. 1. That signal is applied to a series of waveplates to produces a controllable distribution of polarization states that vary continuously over at least a span in the range of wavelengths. The wavelength signals are attenuated as a function of polarization state using a downstream polarizer P2 or another polarization discriminating filter or diverter. The waveplates are aligned at substantially 45° relative to each other. The alignments at 45° intervals ensure maximum polarization effect. Other angles may be used advantageously where the range of the polarization transformation is to be limited to a certain range.

The challenge is to produce a useful variation in polarization state that can provide a parameter whereby a polarization responsive filter or beam splitter can effect a continuous adjustment of intensity as a function of wavelength. Advantageously this permits the adjustment of the attenuation profile, over the span of wavelength.

Figure 1:
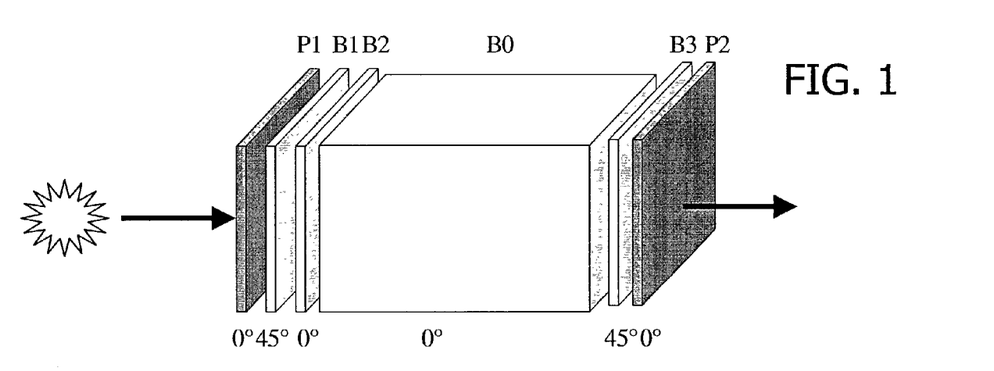
FIG. 1 is a schematic perspective view of an optical system according to the invention, with the inventive attenuation profile adjustment element shown exploded for clarity.

FIG. 1 shows a preferred configuration of the present invention. This exemplary device comprises two polarization sensitive elements, for example, polarizers, P1 and P2; three variable birefringent waveplates: B1, B2, and B3; and one fixed birefringent waveplate B0.

It should be understood that the polarizers are described only with respect to the effect of controlling or limiting transmission along one path. That is, the "polarizers" may be simple plane polarization filter elements, or they may be polarization beam displacers or polarization beam splitters or other polarization sensitive devices whose operation affects the light energy on a given path and thus produce at least one path where their affect is polarization dependent attenuation. Along that path, the devices produce a polarization discriminating effect.

The orientation of the components shown in FIG. 1 is also merely exemplary, i.e., one example of a number of possible orientations of these optical components whereby a similar function is achieved. These and other configurations can be used to realize the variable attenuation tilt control of the invention, as will be apparent from the discussion of the examples below, which are directed in part to a non-limiting example, with a general configuration characterized by P1, P2, B2 and B0 having the same orientation, and are 45 degree with respect to the orientations of B1 and B3. Because the final interest of the present invention is regarding the light intensity, therefore, a 90 degree difference in orientation will generally yield similar transmission spectrum.

This orientation refers to the angular orientation of the elements relative to an arbitrary angular reference in a plane normal to the beam path. In this disclosure, descriptions that state or imply absolute or relative positions, such as vertical, horizontal, above, below, etc., are used only for convenience and simplicity in describing the embodiments depicted in the drawings under discussion. Such absolute and/or relative positions should not be construed to require the same positions or necessarily to imply that such positions are required as a matter of function, unless so stated.

In FIG. 1, the leading polarizer P1 is used as an exemplary way to arrange the incident light energy as well-defined linearly-polarized light. For arbitrary incident light, a polarization diversity scheme can be used, to convert an unknown polarization state into a well defined polarization state. Briefly, polarization diversity schemes are generally known, typically converting incident light of arbitrary polarization states into two well defined two orthogonal polarized states (preferably, linearly polarized states) that are handled along spatially distinct paths. There are a number of ways known to the person of ordinary skill to realize a polarization diversity scheme as described, such as using walk-off crystals, polarization beam splitters, etc, and including using a half-wave plate to convert two orthogonal linearly polarized states into one.

The tunable elements (B1, B2, B3) in this case may be any tunable optical anisotropic material, such as nematic liquid crystal cells, whose birefringence can be adjusted by external controls, such as varying a voltage applied to the liquid crystal cell or other electro-optic elements or other controllable birefringent elements, which may be adjusted for example by other means such as temperature.

The fixed element (B0) may be any birefringent optical material, such as an appropriately cut calcite crystal, or birefringent fiber. A number of other tunable and fixed birefringent elements may be used instead. The optical length of the fixed element and the optical retardation that it produces, are determined (as described in the following section) with respect to the wavelength range of interest, such as the C band in telecommunication.

The operational principles of the configuration shown in FIG. 1 are discussed as follows, as an illustrative example. For other configurations, the operational principles are similar, and should be compared to FIG. 1 in a functional sense to achieve these ends.

Retardation is a repetitive function with a modulus of $2\pi$ radians or 360°. Stated another way, the transmissive function of transmitted intensity as a function of wavelength is an oscillating one with respect to the wavelength or frequency, with the same results obtained at zero, $2\pi$, $4\pi$, etc.

The frequency of this oscillation in the transmissive function is determined by the retardation. In general, for configuration shown in FIG. 1, the retardation of B0 is much larger compared to the retardation of the tunable elements; therefore, the frequency of the oscillation is determined mainly by the retardation of element B0. The phase of the oscillation in the transmissive function can be tuned by the retardation of B2, the control of which permits moving the wavelength positions of the cusps in FIG. 5. The amplitude of the oscillation in the transmissive function can be tuned by the retardation of B1 and B3. In a preferred embodiment, B0 is long enough to provide the desired oscillation period regarding to the wavelength span of interest. As a result it is possible to choose a section in the oscillating transmission function that has a rising or falling slope. With correct choices of values, and optionally an algorithm for feedback control, it is possible to choose a useful tilt adjustment, e.g., to cancel an unwanted variation in optical power variation over a wavelength span. The following contains a detailed discussion of how and why these parameters can be chosen. In a general case the values B1, B2 and B3 are independently adjustable as for example for structure shown in FIG. 1. In other cases, to reduce the number of control parameters, the operation of B1 and B3 is linked to a common control.

The fixed birefringent waveplate B0, which can be calcite crystal, $LiNbO_3$, hi-birefringence fiber or the like, is used to define an operational bandwidth. The bandwidth is comparable to the fundamental period of the resulting wavelength dependent transmittance function, given by $\Delta\lambda=2(\lambda_1-\lambda_0)$, as shown in FIG. 5. The birefringence of B0 can be expressed as $\Delta n$, difference between the two refractive indices. Ideally, a linear slope requires the phase retardation for the wavelength span of interest are between 0 and $\pi$. Therefore the above requirement can be expressed as follows $$2\pi d\Delta n\left(\frac{1}{\lambda_0}-\frac{1}{\lambda_1}\right)=\pi. \quad (1)$$

The physical thickness d of element B0 can be derived from Equation (1).

Tunable element B2 is oriented with its principal optic axis parallel to that of the fixed element B0. The retardation of B2 can be used to control the phase of the oscillation in the transmissive function. While adjusting the phase of the oscillation, the combined retardation of B0 and B2 also changes. However, in most cases, because the retardation of B2 is much smaller compared to that of B0, this small change in general may be omitted.

In general, the temperature dependence of optical components is sometimes an important design consideration. For example, temperature variation may affect birefringence, and such temperature parameters should be taken into account. In a simplest case, a temperature stabilized physical package may be provided. In a more complex arrangement such as one employing a control algorithm, it may be possible to conform to temperature effects, for example using a measured temperature or related quantity to modify other parameters such as the length of element B0 or another value, and to find in a stored look up table (not shown) the values needed for accurate transmission-to-wavelength conversion. In another example, a feedback control can be used to achieve a given sensed condition regardless of temperature variations. Stated differently, the temperature variation of the various elements can be compensated by readjusting the voltages across the tunable birefringent elements using a calibration procedure. In this procedure the variations of the birefringent elements, both nominally fixed and tunable are measured as a function of temperature so that the known values of the readjustment can be calculated at a known temperature of the device. The temperature of the device may be obtained by means other than direct measurement, for example by measuring the capacitance or resistance change of the electro-optic device, the value of which can change as a function of temperature.

(a): Coupled Structure: Slope and Wavelength Adjustment

In an optimal arrangement, it is desirable to control the slope and the wavelength at which the maximum transmission value occurs (the peak cusp wavelength $\lambda_0$ in FIG. 5). This requires at least two control parameters.

In the configuration shown in FIG. 1, if the first and the last variable waveplates B1, B3 are coupled together to have the identical retardation, then there are only two variables in the system. These variables are the retardation of waveplate B2, which is termed $\phi 2$ and is used to control the wavelength of the maximum transmittance, and that of waveplates B1 and B3, which are commonly controlled and equal ($\phi 1=\phi 3$) and can be used to control the slope.

Figure 6:
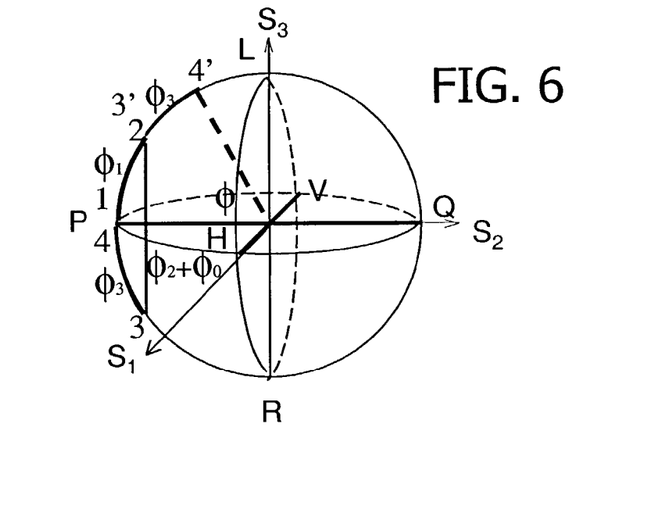
FIG. 6 is a Poincaré sphere illustration of the polarization effects of certain elements employed according to the invention.

The operational principles and effects of the invention can be visualized using a depiction of the resulting Stokes parameters using the Poincaré Sphere, shown in FIG. 6. In the following discussion, as an example, it is assumed that the orientations of P1, B1, B2, B0, B3 and P2 are $-45°$, $0°$, $45°$, $45°$, $0°$, $-45°$, respectively. The light in B1 has been processed by P1, construed to be a polarizer or preferably a polarization diversity arrangement. In any event, the input to B1 is linearly polarized at $-45$ degrees, which is the orientation determined or defined by P1. On the Poincaré Sphere, this state of polarization is represented by a point on the equator, point 1. Waveplate B1 is oriented at 0 degrees. The effect of B1 on the state of polarization can be visualized on the Poincaré Sphere as a rotation from point 1 to point 2. The rotation axis is the HV axis because the orientation of B1 is 0 degree. The amount of rotation is the retardation of B1, namely $\phi 1$. According to FIG. 5, the intensity at wavelength $\lambda_0$ is 100%. This can be assured by setting $\phi 1=\phi 3$ and $\phi 0(\lambda_0)+\phi 2(\lambda_0)=(2n+1)\pi$, as shown in FIG. 6. Rotation from point 2 to point 3 is about the PQ axis because B0 and B2 are oriented at 45 degrees. Because $\phi 0$ is defined by the fundamental period of the transmittance (see equation (1)), $\phi 2$ can be defined as follows, $$\phi_2=(2n+1)\pi-\phi_0. \quad (2)$$

$$\phi_1=\phi_3. \quad (3)$$

The retardation is defined as $$\phi=\frac{2\pi d\Delta n}{\lambda}. \quad (4)$$

As discussed above, insofar as two control variables are needed to achieve the function described, it is advantageous to control B1 and B3 commonly and to obtain the same retardation from each. Although this coupled $\phi_1=\phi_3$ condition is not necessary to operation, it is preferred because it simplifies the control algorithm by eliminating what is essentially an unneeded extra variable. A more general control algorithm is discussed later, wherein the differential retardation from two comparable waveplates is uncoupled.

Also from FIG. 5, the minimum or cusp at the lowest transmissive intensity occurs at a wavelength $\lambda_1$. As FIG. 6 suggests, the lowest intensity is defined by the arc length 1 to 4'. Therefore, $\phi_1$ and $\phi_3$ can be defined as follows, $$\phi_1 = \phi_3 = \cos^{-1}(\sqrt{I(\lambda_1)}). \quad (5)$$

By the use of equations (2) and (5), the desired slope can be achieved by setting the appropriate retardation to variable waveplates B1, B2, and B3.

The above discussion is based on the Poincaré Sphere, which is a useful tool to visualize the polarization transformation. The same results can be achieved using Jones matrix and/or Muller matrix calculations. The calculated result can be expressed as follows, $$I = \frac{1+S_1}{2} = 1 - \cos^2\frac{\phi_0+\phi_2}{2}\sin^2\phi_1. \quad (6)$$

The slope can be controlled by adjusting $\phi_1$. Also, by adjusting $\phi_2$, the operation wavelength range can be swept and the phase of oscillation can be adjusted. According to equation (4) and (6), the transmittance is substantially linear with respect to wavelength if $(\lambda_1-\lambda_0)<<\lambda_0$.

The operating principle discussed above is only one example. The configuration similar to that shown in FIG. 1 can be used for other purposes as well. For example, it can also be used for overall attenuation control. If the retardation of B1 and B3 is set to be $2\pi$, B2 and B0 will not affect the transmittance, because they are parallel to the polarizers. Therefore, the overall transmittance will be controlled by the retardation of B3 and B1. Because B1 and B3 can be zero-order waveplates, the transmittance will be uniform in a relatively large wavelength band.

In order to test the validity of the above discussion, a numerical calculation was run using a simulation program, and then compared to experimental results. The numerical and experimental results show excellent agreement and conform with the above discussion.

Figure 7:
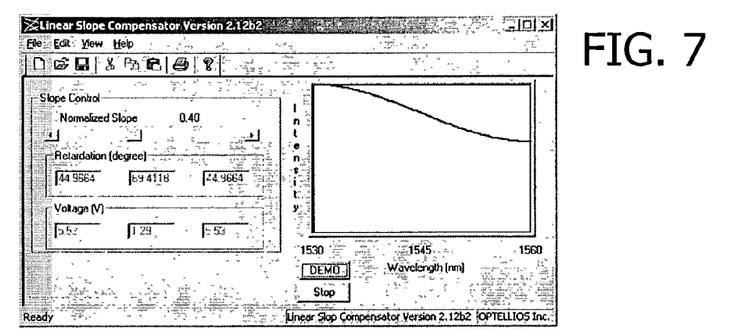
FIG. 7 is a simulation plot of intensity versus wavelength, illustrating a substantially continuous portion of a curved of transmission amplitude versus wavelength according to the invention, encompassing substantially one maximum and adjacent minimum.
Figure 8:
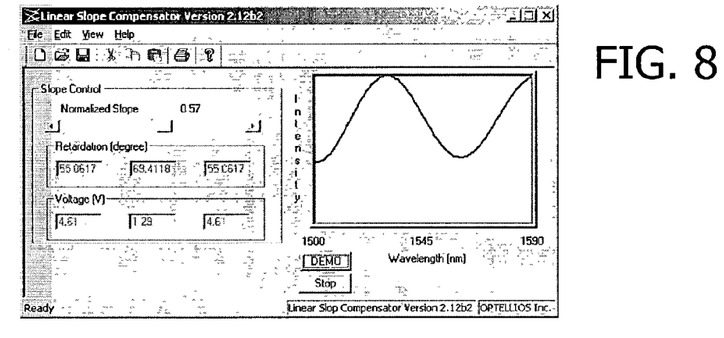
FIG. 8 is a simulation as in FIG. 7, using different values and showing a different control setting of the tilt profile.
Figure 9:
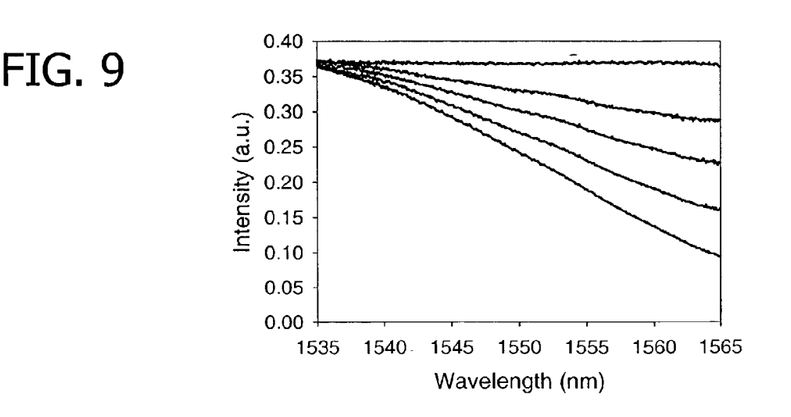
FIG. 9 is a plot of intensity versus wavelength showing results of experimental tests of in different control conditions according to the invention.
Figure 10:
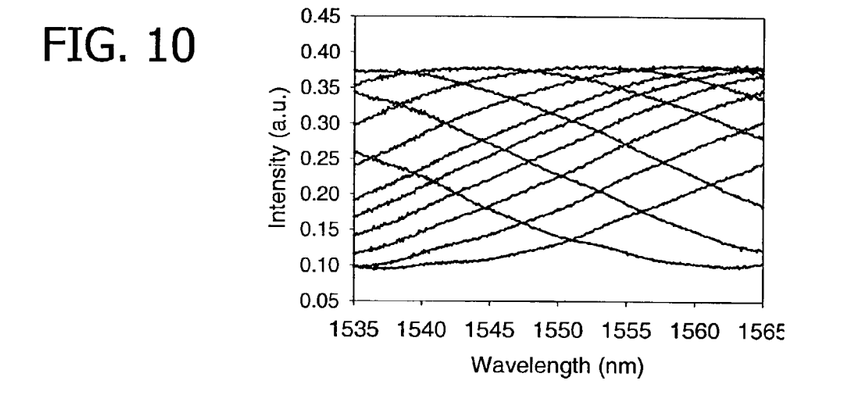
FIG. 10 is a plot of intensity versus wavelength as in FIG. 9, with demonstration of the sinusoidal nature of the transmission transfer function and with sweeping of the center frequency.

FIG. 7 shows simulation results wherein a slope is selected by appropriate retardations at B1, B2 and B3. In FIG. 9, the waveform of the FIG. 7 simulation was verified experimentally and was shown to be variable in slope as expected by selection of appropriate retardations. FIG. 8 shows similar results for a wider band of wavelength, and demonstrates the periodic nature of the transmissive function. In FIG. 10, experimental results confirm the sinusoidal function and shown the availability of rising and falling slopes. The waveform in FIG. 9 shows changes to the slope. The waveform in FIG. 10 demonstrates sweeping of the frequency by changing the retarding of B2.

The simulation program interface, shown in FIGS. 7 and 8, was operated on a PC and could readily be provided as a part of a control system. The interface as shown is arranged with manual input controls via scroll bars. The resulting control voltages and differential retardation angles are determined and displayed on the interface for the individual variable waveplates. For this simulation and as used experimentally to obtain plotted results in FIGS. 9 and 10, liquid crystal cells were used as the variable waveplates.

The experimental prototype used to obtain the results was made with a fixed waveplate comprising two calcite crystals with orthogonal optical axes and slightly different thicknesses. The difference in thickness was about 0.2 mm. This thickness defines a fundamental period about 30 nm. Liquid crystal cells were used as the variable waveplates. The retardations of the liquid crystal cells are controlled by applied voltages. The range of control of the birefringence was about $2\pi$ The voltage-retardation relation was determined by experiment.

(b): Decoupled Structure: Arbitrary Control

In the previous section, a coupled structure of the Optical Attenuation profile Controller is disclosed and described as preferable in connection with simplicity of control. The device as described can generate variable slope and can vary or sweep the wavelength positions of the cusps. The simplicity of the inventive control algorithm is carries a limitation, however in that the spectrum is pinned at one wavelength $\lambda_0$, whose transmission is 100%, and the slope is permitted to change by variations in the control. In this section, a decoupled structure is discussed. The tilt controller has an optical layout that is comparable to that of the previous section, but is not characterized by coupling and/or common control of the retardation of waveplates B1 and B3. This embodiment is capable using an inventive control algorithm to generate an arbitrary linear transmissive spectrum, and is not bound by a limitation of 100% transmission pinned wavelength. The same configuration and control algorithm can also be used to generate transmission profile which are not linear.

To understand how the wavelength of the light passing through the series of birefringent elements described above is polarization encoded, consider completely polarized light, which can be represented by a Jones vector:

$$E = \begin{bmatrix} E_x e^{i\varphi_x} \\ E_y e^{i\varphi_y} \end{bmatrix}. \quad (7)$$

In the case of linearly polarized light, for example, both components of the Jones vector can be represented by real numbers.

A transformation of the state of polarization is represented by a 2×2 matrix, the Jones matrix. For instance, a linear birefringent plate with retardance $\phi$ and slow axis oriented at 0° is represented by the following Jones matrix:

$$M(a,0) = \begin{bmatrix} e^{-i\phi/2} & 0 \\ 0 & e^{i\phi/2} \end{bmatrix}. \quad (8)$$

The retardance of a wave plate is defined by Equation (4).

The Jones matrix for a birefringent waveplate oriented at 0 degree (the element B0 and B2 of the Optical Tilt Controller) is given by $$M_{B0+B2}(\phi_0+\phi_2,0) = \begin{bmatrix} 1 & 0 \\ 0 & e^{-i(\phi_0+\phi_2)} \end{bmatrix}, \quad (9)$$

where $\phi i$ is the total retardance of Bi.

A linear birefringent plate oriented at an angle $\theta$ is described by $$M(\phi,\theta) = R(-\theta)M(\phi,0)R(\theta), \quad (10)$$

where $R(\theta)$ is the rotation matrix:

$$R(\theta) = \begin{bmatrix} \cos\theta & \sin\theta \\ -\sin\theta & \cos\theta \end{bmatrix}. \quad (11)$$

The Jones matrix representing wave plate B1 of the tilt equalizer is given below (the matrix for wave plate B3 has the same form, with $\phi 3$ replacing $\phi 1$):

$$M_{B1}(\phi_1) = \frac{1}{2}\begin{bmatrix} 1+e^{-i\phi_1} & 1-e^{-i\phi_1} \\ 1-e^{-i\phi_1} & 1+e^{-i\phi_1} \end{bmatrix}. \quad (12)$$

Each wave plate transforms the polarization state of the passing light in a manner defined by its retardance and the direction of its birefringent axes. The state of polarization of the transmitted light is determined by multiplying the Jones vector of the incident light by the Jones matrix of the optical component:

$$E_t = ME_i \quad (13)$$

The final state of polarization can be determined by repeating this operation for each element of the optical system (the light transmitted by the first element becomes incident on the second one, and so on). Alternatively, the cumulative effect of the series of wave plates can be expressed by in the form of a single Jones matrix:

$$M = M_n M_{n-1} \ldots M_2 M_1 \quad (14)$$

where $M_1$ through $M_n$ are Jones matrices of individual elements, in the order as encountered by the light. The Jones matrix for the Optical Tilt Controller is $$M = M_{B3}(\phi_3) M_{B0+B2}(\phi_2+\phi_0) M_{B1}(\phi_1), \quad (15)$$

where $\phi_{0-3}$ is wavelength dependent, as shown in Eq. (4).

As a result, the light incident on the tilt equalizer ends up in a polarization state which depends on the initial polarization and the retardance values for each wave plate (and therefore on the wavelength). Dependence on the incident polarization state can be eliminated, for example by ensuring a known polarization state using one or more polarization filters, or more preferably by a polarization diversity scheme. Thus a simple case can be considered wherein the incident light is linearly polarized, oriented at zero degrees, accomplished (for example) by passing it through a polarizer at 0°. Such a polarized light beam is represented by the Jones vector $E_i = E_0(1,0)$, where $E_0$ is the amplitude of the electric field in the incident wave. The light emerging form the tilt equalizer is then described by $$E_t = ME_i = E_0 \begin{bmatrix} M(1,1) \\ M(2,1) \end{bmatrix}. \quad (16)$$

The transmitted wave will have a distinct polarization given by Eq. (16) for each wavelength present in the incident light. While the wavelength of the light is now encoded by its polarization, its intensity is unchanged since the wave plates by themselves introduce no loss other than small unintentional attenuation. However, wavelength-dependent loss can now be introduced by passing the light through a polarizing device, such as a polarizer, oriented at 0°. For each wavelength, the Jones vector of the transmitted light will become $E_0(M(1,1),0)^T$ and its intensity $|M(1,1)|^2 E_0^2 = \Gamma(\lambda)E_0^2$. Thus the degree of the wavelength-dependent attenuation is given by the square of the upper left matrix element of the tilt controller's Jones matrix.

For the configuration shown in FIG. 1, the attenuation $\Gamma(\lambda)$ can be calculated using Jones matrix method, as follows, $$\Gamma(\lambda) = \frac{1}{2} + \frac{1}{4}\cos(\phi_1 - \phi_3) + \frac{1}{4}\cos(\phi_1 + \phi_3) - \quad (17)$$
$$\frac{1}{8}\cos(\phi_1 + \phi_0 + \phi_2 - \phi_3) - \frac{1}{8}\cos(\phi_1 - \phi_2 - \phi_0 - \phi_3) +$$
$$\frac{1}{8}\cos(\phi_1 + \phi_2 + \phi_0 + \phi_3) + \frac{1}{8}\cos(\phi_1 - \phi_2 - \phi_0 + \phi_3)$$

where the wavelength dependence of the retardances $\phi$ can be expressed as follows, $$\phi_1 = \Theta_1 \frac{1550}{\lambda}; \quad (18)$$
$$\phi_2 = \Theta_2 \frac{1550}{\lambda},$$
$$\phi_0 = 45.42\pi \frac{1550}{\lambda};$$
$$\phi_3 = \Theta_3 \frac{1550}{\lambda}.$$

It is easy to verify that if we set $\phi_1 = \phi_3$, equation (17) will reduce to equation (6).

The parameters $\Theta$ are retardances of the wave plates at the reference wavelength of 1550 nm. In equation (18), the retardance $\phi_0$ is the retardance of the fixed element B0, which is chose to be 45.42$\pi$ by the use of Equation (1) for 1550 nm wavelength because of the intent of using this device in the C band (1530 nm–1560 nm). Our calculation reveals that in order to have 30 nm period of the oscillating spectrum at wavelength 1550 nm, the retardation should be about 50$\pi$, and 45.42$\pi$ is the measured retardation of the calcite crystal used in our experiment.

In the example provided in this disclosure, the retardation of B0 is nominally fixed, while the retardation of the tunable element is much smaller compared to that of the fixed element; therefore the fundamental frequency of the oscillating spectrum can be assumed to be constant. There are several means to change this basic oscillating frequency. One way is to cascade two or more birefringent sections in which the principal optic axis are aligned parallel to each other sandwiched by tunable wave plates whose principal optic axis is oriented at 45 degree with respect to these birefringent sections. The purpose of the variable wave plate is to either preserve the polarization state (when the retardation is even multiple of $\pi$) or change the polarization to orthogonal state (when the retardation is odd multiple of $\pi$). Because the birefringent sections are parallel to each other, the effective retardation will be the sum or the difference of the individual section depends on the polarization is preserved or switched to the orthogonal state. Therefore, by toggling the retardation of the variable waveplates between even or odd multiple of $\pi$, we can adjust the effective retardation and hence the wavelength range of interest in a binary manner. In another embodiment, the tunable element may be controlled so that the retardation is not multiples of π, but could be any value. This would allow greater control of the attenuation function at the expense of increasing the number of control parameters.

An attenuation factor $\Gamma(\lambda)$ can be determined against $\lambda$ for combinations of differential phase retardation values for $\Theta_1$, $\Theta_2$ and $\Theta_3$. In order for the attenuation profile controller to compensate effectively for a linear intensity profile in the incoming light signal, the parameters $\Theta$ need to be selected such that in the wavelength range of interest, the attenuation profile $\Gamma(\lambda)$ is close to linear, as well as having the necessary slope to cancel the slope of the incoming light, and preferably the to obtain a desirable average attenuation values (possibly but not necessarily a minimum attenuation). The target wavelength range is approximately 1530 to 1560 nm, the C-band of an optical fiber.

On way to arrive at the set of retardation values that best achieves the desired results is to search for a set of values. There are a number of possible techniques. One of them is described below.

The retardance of wave plate B2 is set to such a value that a linear or approximately linear part of the attenuation curve is centered within the desired band, e.g., the C-band. For example, a selected $\Theta_2$ value places the center point of the linear attenuation profile at $\lambda_0=1542$ nm.

The other two parameters may now be adjusted to obtain the proper slope and the proper average attenuation level. The adjustment of the slope is accomplished as follows. The first step is to identify the target values. For simulation purposes those may be set arbitrarily. In the device, the target slope and average level are obtained by fitting a line to the measured power spectrum. If the power profile to be flattened is given by $-\alpha\lambda+\beta$, the target attenuation profile is $\alpha\lambda+\beta$. The corresponding values of $\Theta_1$ and $\Theta_3$ are found by simultaneously solving the following set of equations:

$$\Gamma(\lambda_0) = \alpha\lambda_0 + \beta \quad (19)$$
$$\frac{d\Gamma}{d\lambda}(\lambda_0) = \alpha$$

The solution is obtained numerically by using the basic Newton algorithm. This algorithm advantageously begins from an initial estimate of $\Theta_1$ and $\Theta_3$. A more complicated algorithm is possible in lieu of an initial estimate, but is not necessary because it empirical estimates are possible with reasonable accuracy that can be followed up by fine tuning.

Figure 11:
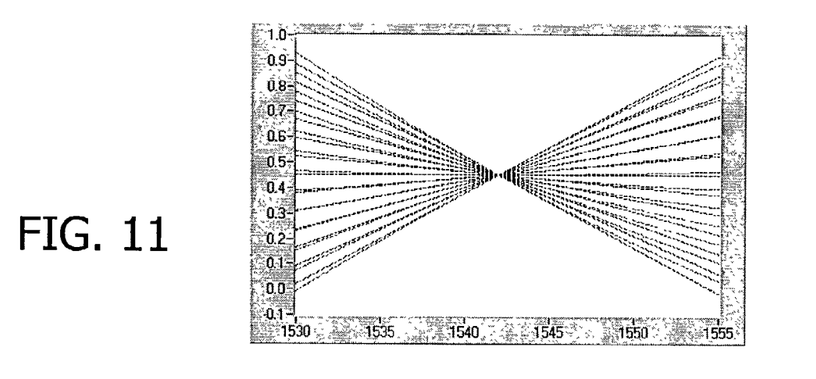
FIG. 11 is a two dimensional plot of intensity versus wavelength, showing close correlation between target slopes and simulation results.

Some $\Gamma(\lambda)$ curves that are ver nearly linear over the C band were obtained by the application of this numerical procedure and are shown in FIG. 11, together with the corresponding linear target lines that were sought to be matched. The fixed transmission point can be an arbitrary choice, but as noted is preferably in the band of interest. In the foregoing tests and examples, the fixed point is chosen to be 50% transmission and to have a wavelength of 1542 nm. Other values are possible.

The program uses Newton's Algorithm, and tries many different initial values if the first several don't give a reasonable solution. The iteration number is limited to a preset value to prevent calculation from using too much CPU time.

The actual computing time for most cases is well below 1 ms on a PIII 800 MHz machine, which is suitable for an implementation of DSP on an actual device.

(c): Semi-Coupled Structure

Although the decoupled structure offers the ability of more general control, the control itself involves several numerical calculations, and the solution may not be deterministic. In this section, we introduce a new design, which offers some advantages over the coupled mode operation, and the control is much simpler compared to the decoupled mode operation.

Figure 12:
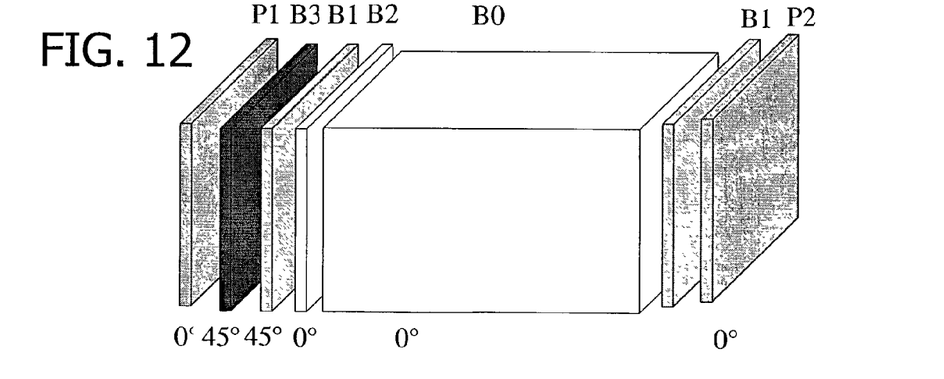
FIG. 12 is a perspective view of an alternative embodiment employing uncoupled controls for the respective waveplates
Figure 13:
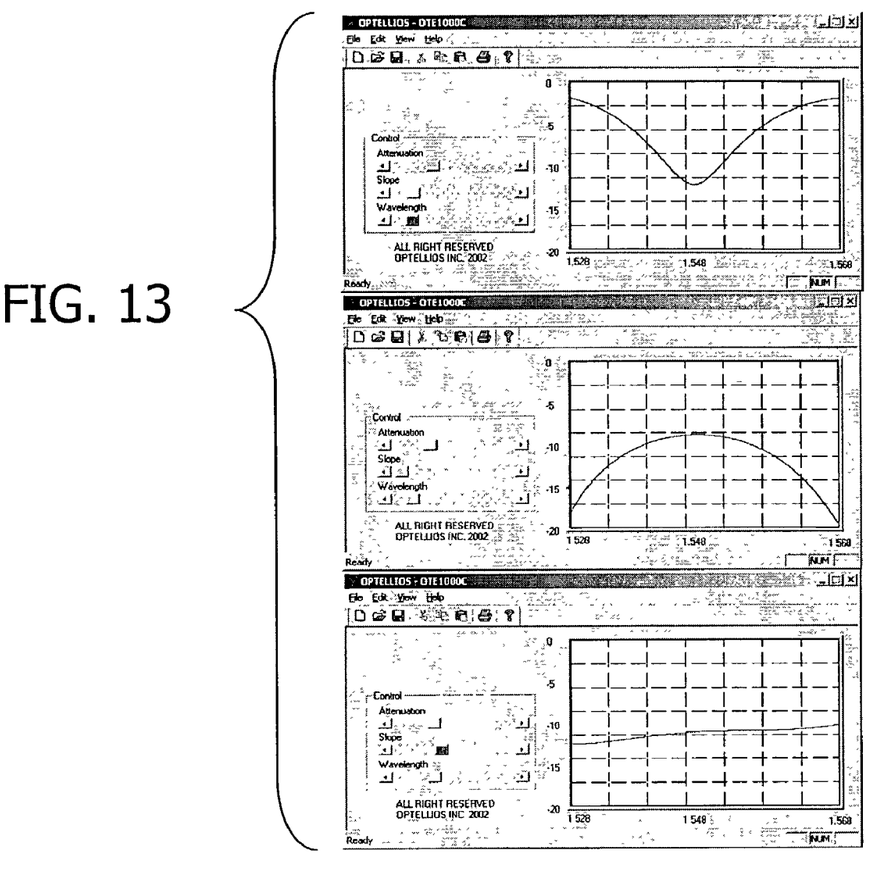
FIG. 13 is a series of simulation results wherein different settings for attenuation, slope and amplitude have been selected to illustrate gain profiles achievable in a wavelength range from about 1530 to about 1570 nm.

The structure is shown in FIG. 12. The difference between semi-coupled and coupled is an additional cell B3 in the semi-coupled structure. The presence of B3 gives the system more functionalities but at the cost of adding another active component Three simulation results are shown in FIG. 13. They demonstrate functionalities of the semi-coupled mode. It is clearly illustrated in FIG. 13 that the semi-coupled mode can generate not only a linear curve, but also other attenuation profiles.

Note that if the retardation of B3 ($\phi_3$) is set to be zero or integer multiply of $2\pi$, the structure can be reduced to the coupled mode. According to Equation (17), the transmission spectrum of the semi-coupled structure shown in FIG. 12 can be represented as follows, $$\Gamma(\lambda) = \frac{1}{2}(1+\cos\phi_3) + \frac{1}{2}[\cos(2\phi_1+\phi_3) - \cos\phi_3]\cos^2\frac{\phi_0+\phi_2}{2}. \quad (20)$$

Equation (20) clearly illustrates that the transmission is a function of the retardations of all waveplates. However, according to our previous discussion, the wavelength dependence is most affected by the retardation of the large waveplate ($\phi_0$). Therefore, equation (20) can be rewritten as follows, $$\Gamma(\lambda) = A + k \cdot \cos^2\frac{\phi_0+\phi_2}{2}. \quad (21)$$

Based on equations (20) and (21), the overall attenuation term A can be adjusted by controlling $\phi3$, which is an additional freedom compared to the coupled mode. Furthermore, the slope k, in the semi-coupled mode is a function of both $\phi1$ and $\phi3$. Therefore, although the overall attenuation can be controlled by varying $\phi3$, the slope will change as well. However, because the relation between the slope k and the overall attenuation A is simple, it is possible to design a controlled adjustment of $\phi1$ and $\phi3$, such that the slope change due to the attenuation adjustment can be compensated. We note that in some cases, fundamentally it may not be possible to maintain the slope k as a constant while the overall attenuation A is changing. This is because the transmission function $\Gamma(\lambda)$ is limited to be less than 100%, unless the system includes a gain mechanism.

This disclosure introduces a novel optical tilt control device, which is based on the wavelength dependent polarization transformation. The device contains a fixed birefringent waveplate with a relatively large retardation. The purpose of this fixed, large retardation waveplate is to separate the wavelengths by polarization encoding: different wavelengths have different states of polarization. The variable waveplates are used to control the overall transmittance characteristic.

The device can generate arbitrary linear transmissive spectrum, with the freedom of sweeping the wavelength and adjusting the overall attenuation level. The tunability is achieved by tunable optical anisotropic material, such as liquid crystal material.

Three exemplary configurations are introduced. The coupled configuration has the advantage of simple control algorithm. But the slope change is limited by the requirement of a 100% transmission wavelength. This limitation can be eliminated by the use of the decoupled configuration. However, the parameters in that case need to be obtained numerically using a search algorithm. The semi-coupled configuration has one more waveplate, but it has more functionalities compared to the coupled configuration, and much simplifier control compared to the decoupled configuration.

Numerical and experimental results are presented to support our discussion. Our device has many advantages. The simple design and the simple control algorithm are the most obvious.

The device itself is not limited to be used as a variable attenuation tile control device; it can also be used for other applications, such as overall attenuation. Further more, the Poincaré Sphere method of analyzing the optical device is a general method, and can also be applied to designing different devices.

We claim:

1. An apparatus for providing a profile of attenuation as a function of wavelength, in an optical system for carrying a plurality of wavelengths in a wavelength range of interest, the apparatus comprising:
   at least one light transmission path for the plurality of wavelengths, wherein the wavelength range of interest is presented as a polarization-referenced input signal with predetermined polarization states;
   a differential phase retardation section coupled to the polarization-referenced input signal, the differential phase retardation section including at least two birefringent elements, so as to produce a change in polarization state as a function of wavelength, in an output from the differential phase retardation section; and,
   further comprising at least one polarization-referenced output element operable to discriminate components of the output of the differential phase retardation section as a function of polarization state; and,
   a control circuit operable to generate a set of control signals that are applied to the birefringent elements to obtain a desired contoured profile of attenuation as a function of wavelength.

2. The apparatus of claim 1, further comprising at least one polarization-referenced input element disposed in the light transmission path disposed before the said differential phase retardation section, to produce the said polarization referenced input signal.

3. The apparatus of claim 1, wherein the change in polarization state as a function of wavelength is substantially continuous over a wavelength band.

4. The apparatus of claim 2, wherein said polarization reference input element comprises a polarization diversity element that produces two distinct polarization referenced light paths, wherein each of the paths encounters a said differential phase retardation section and a said polarization-referenced polarization diversity output element,
   whereby the input signal, is transformed in a polarization independent contoured profile of attenuation, as a function of wavelength.

5. The apparatus of claim 2, wherein the polarization-referenced input element and the polarization-referenced output element are aligned relative to one another at a predetermined orientation.

6. The apparatus of claim 5, wherein the predetermined orientation is one of substantially parallel and substantially orthogonal.

7. The apparatus of claim 1, wherein the differential phase retardation section comprises at least two adjacent birefringent elements having a relative orientation of fast optical axes substantially at 45 degrees with respect to each other.

8. The apparatus of claim 7, wherein at least one of said birefringent elements is tunable.

9. The apparatus of claim 1, wherein the differential phase retardation section comprises at least one tunable element producing a change in birefringence as a function of a control parameter, providing at least one degree of freedom of adjustment, and wherein the said at least one degree of freedom of adjustment substantially controls at least one of a slope, a wavelength range, a cusp wavelength and an overall attenuation, over at least a span of the wavelength range of interest.

10. The apparatus of claim 9, wherein said at least one said tunable element contributes a differential phase change that is less than ten percent of a differential phase change controlled by another birefringent element of the differential phase retardation section.

11. The apparatus of claim 1, wherein at least a part of the differential phase retardation section comprises a liquid crystal device.

12. The apparatus of claim 9, wherein at least a part of the tunable element comprises a liquid crystal device.

13. The apparatus of claim 1, wherein the differential phase retardation section comprises at least two adjacent birefringent elements that are oriented with fast optical axes that are one of substantially parallel and substantially perpendicular to each other, and wherein at least one of said birefringent elements is tunable.

14. The apparatus of claim 1, wherein at least part of the differential phase retardation section comprises a block section comprising at least three birefringent elements placed along the light transmission path and oriented such that fast optical axes of a first element and a last element of the said at least three birefringent elements of the block section are at least one of substantially parallel and substantially perpendicular to each other.

15. The apparatus of claim 14, wherein the first and the last element of the said block section are tunable.

16. The apparatus of claim 15, wherein the first and the last elements of the said block section are tunably coupled based on a same control parameter.

17. The apparatus of claim 16, wherein the first and the last elements have substantially the same retardation, and wherein said control parameter adjusts a slope of the contoured profile of attenuation.

18. The apparatus of claim 13, wherein at least one of the two adjacent birefringent elements is adjusted based on a control parameter to set a peak transmission wavelength of the contoured attenuation profile.

19. The apparatus of claim 1, wherein at least a portion of the differential phase retardation section comprises a digitally tunable birefringent section, wherein the digitally tunable birefringent section has at least two fixed birefringent elements that are separated by a digitally controllable polarization rotator.

20. The control signals in claim 1 wherein the control signals are voltages.

21. The control circuit in claim 1 where the circuit includes a feedback control.

22. A method for providing a profile of attenuation as a function of wavelength, in an optical system for carrying a plurality of wavelengths in a wavelength range of interest, comprising the steps of:
   transmitting a light energy signal having predetermined polarization states, along at least one transmission path, so as to provide a polarization-referenced input signal over a wavelength range of interest that includes said plurality of wavelengths;
   differentially phase retarding distinct components of the polarization-referenced input signal, so as to induce a change in polarization state as a function of wavelength, including passing the polarization-referenced input signal through a differential phase retardation section to an output; and,
   discriminating components of the output of the differential phase retardation section as a function of polarization state and controlling the contoured profile of attenuation by operating a control circuit to generate a set of control signals that are applied to the birefringent elements to obtain a desired contoured profile of attenuation, thus inducing in the light energy signal a contoured profile of attenuation as a function of wavelength.

23. The method of claim 22, wherein said differential phase retarding of the distinct components of the polarization-referenced input comprises passing the polarization-referenced input signal through a differential phase retardation section having at least two birefringent elements.

24. The method of claim 22, wherein said discriminating of components of the output of the differential phase retardation section as a function of polarization state is accomplished by passing the output of the differential phase retardation section through at least one polarization-referenced output element.

25. The method of claim 22, further comprising providing two distinct polarization referenced light paths for accommodating diverse polarization states of the light energy signal, wherein each of the paths is differentially phase retarded and discriminated.

26. The method of claim 22 wherein said differential phase retarding of the distinct components of the polarization-referenced input signal is accomplished by passing the polarization-referenced input signal through a differential phase retardation section having at least two birefringent elements; and said discriminating of components of the output of the differential phase retardation section as a function of polarization state is accomplished by passing the output of the differential phase retardation section through at least one polarization-referenced output element; and further comprising aligning the polarization-referenced input element and the polarization-referenced output element relative to one another at relative orientations that are one of substantially parallel and substantially orthogonal to one another.

27. The method of claim 26, wherein differential phase retardation comprises passing the polarization-referenced input signal through at least two adjacent birefringent elements having a relative orientation of fast optical axes substantially at 45 degrees with respect to each other.

28. The method of claim 27, further comprising tuning at least one of said birefringent elements so as to adjust the contoured profile of attenuation.

29. The method of claim 22, wherein the differential phase retardation is accomplished by passing the polarization-reference input signal through a phase retardation section having at least one tunable element and tuning said element to produce a change in birefringence as a function of a control parameter, over at least one degree of freedom of adjustment, and wherein said at least one degree of freedom of adjustment substantially controls at least one of a slope, a wavelength range, a cusp wavelength and an overall attenuation, over at least a span of the wavelength range of interest.

30. The method of claim 29, further comprising orienting at least two adjacent birefringent elements of the phase retardation section so that fast optical axes thereof are one of substantially parallel and substantially perpendicular to each other.

31. The method of claim 22, wherein at least part of the differential phase retardation section comprises a block section with at least three birefringent elements along the light transmission path, and further comprising orienting said birefringent elements such that fast optical axes of a first said element and a last said element of the block section are one of substantially parallel and substantially perpendicular to each other.

32. The method of claim 31, further comprising tuning said first and said last element of the block section to control at least one of a slope, a wavelength range, a cusp wavelength and an overall attenuation, over at least a span of the wavelength range of interest.

33. The method of claim 32, comprising tuning said first and said last element of the block section based on a common control parameter, so as to alter said at least one of slope, wavelength range, cusp wavelength and overall attenuation, with one degree of freedom.

34. The method of claim 30, wherein at least one of the said two adjacent birefringent elements is tuned to set a peak transmission wavelength of the contoured attenuation profile.

35. The method claim of 34, further comprising digitally tuning a birefringent section having at least two fixed birefringent elements that are separated by a digitally controllable polarization rotator.

36. The method claim of 22, further including operating said control circuit in a feedback control procedure.

* * * * *